(12) United States Patent
Debler et al.

(10) Patent No.: US 11,351,952 B2
(45) Date of Patent: Jun. 7, 2022

(54) TRIGGERABLE HOLDING DEVICE FOR A SECURING STRAP OF AN AIRBAG, AND HOUSING FOR AN AIRBAG

(71) Applicants: ZF AUTOMOTIVE GERMANY GMBH, Alfdorf (DE); TRW POLSKA SP.ZO.O, Czestochowa (PL)

(72) Inventors: Jens Debler, Iggingen (DE); Maciej Sadowski, Czestochowa (PL)

(73) Assignees: ZF AUTOMOTIVE GERMANY, Alfdorf (DE); ZF AUTOMOTIVE SYSTEMS POLAND SP.ZO.O, Czestochowa (PL)

( * ) Notice: Subject to any disclaimer, the term of this patent is extended or adjusted under 35 U.S.C. 154(b) by 0 days.

(21) Appl. No.: 16/962,901

(22) PCT Filed: Jan. 15, 2019

(86) PCT No.: PCT/EP2019/050928
§ 371 (c)(1),
(2) Date: Jul. 17, 2020

(87) PCT Pub. No.: WO2019/141676
PCT Pub. Date: Jul. 25, 2019

(65) Prior Publication Data
US 2021/0061215 A1 Mar. 4, 2021

(30) Foreign Application Priority Data
Jan. 19, 2018 (DE) .................. 10 2018 101 155.5

(51) Int. Cl.
*B60R 21/2338* (2011.01)

(52) U.S. Cl.
CPC *B60R 21/2338* (2013.01); *B60R 2021/23388* (2013.01)

(58) Field of Classification Search
CPC ............... B60R 21/2338; B60R 21/23388
See application file for complete search history.

(56) References Cited

U.S. PATENT DOCUMENTS

| 6,565,114 B1 * | 5/2003 | Thomas ............ B60R 21/2171 280/728.2 |
| 7,690,683 B2 | 4/2010 | Parks et al. |

(Continued)

FOREIGN PATENT DOCUMENTS

| DE | 102009018482 | 10/2009 |
| DE | 102012007406 | 10/2013 |

(Continued)

*Primary Examiner* — Drew J Brown
(74) *Attorney, Agent, or Firm* — Tarolli, Sundheim, Covell & Tummino LLP

(57) ABSTRACT

The invention relates to a releasable retaining device (10) for a tether (16) of an airbag, comprising a retainer (12), a slit (14) for receiving the tether (16), a blocking member (18) made from metal which is displaceable between a blocking position in which it maintains the tether (16) blocked in the slit (14) and a release position in which the tether (16) is released, and comprising a pyrotechnical igniter (20) coupled to the blocking member (18) such that, upon activation of the igniter (20), the blocking member is displaced from the blocking position to the release position. Moreover, a housing (32) including a retaining device (10) for an airbag is provided.

16 Claims, 8 Drawing Sheets

(56) References Cited

U.S. PATENT DOCUMENTS

| | | | |
|---|---|---|---|
| 8,408,585 B2 | 4/2013 | Paxton et al. | |
| 10,336,284 B2 * | 7/2019 | Dry | B60R 21/2334 |
| 2007/0194561 A1 * | 8/2007 | Thomas | B60R 21/2171 |
| | | | 280/728.2 |
| 2008/0203716 A1 * | 8/2008 | Parks | B60R 21/2338 |
| | | | 280/743.2 |
| 2010/0090445 A1 | 4/2010 | Williams et al. | |
| 2012/0242068 A1 * | 9/2012 | Paxton | B60R 21/2338 |
| | | | 280/743.2 |
| 2012/0242069 A1 * | 9/2012 | Parks | B60R 21/2338 |
| | | | 280/743.2 |

FOREIGN PATENT DOCUMENTS

| | | |
|---|---|---|
| DE | 102012013212 | 1/2014 |
| WO | 2014106567 | 7/2014 |

\* cited by examiner

TRIGGERABLE HOLDING DEVICE FOR A SECURING STRAP OF AN AIRBAG, AND HOUSING FOR AN AIRBAG

RELATED APPLICATIONS

This application corresponds to PCT/EP2019/050928, filed Jan. 15, 2019, which claims the benefit of German Application No. 10 2018 101 155.5, filed Jan. 19, 2018, the subject matter of which are incorporated herein by reference in their entirety.

BACKGROUND OF THE INVENTION

The invention relates to a releasable retaining device for a tether of an airbag and to a housing for an airbag.

Airbags are a part of vehicle safety systems. Frequently, a tether is fastened to an airbag. The tether helps control the deployment of the airbag by releasing, for example, the tether, after the airbag has at least partially been filled with a gas. In this way, a desired deployment behavior of the airbag can be achieved.

Moreover, the tether can prevent the airbag in the inflated condition from deploying excessively far in a particular direction. This function is applied, for example, in adaptive airbag concepts or for active airbag venting. During piloted driving, which is gaining more and more importance, a vehicle occupant can adopt various positions, for example a sitting position when he/she him-/herself is driving, or a reclined position when the vehicle drives on autopilot. When the vehicle occupant is in a reclined position, in the case of need, the airbag must deploy significantly more toward the vehicle occupant than when the vehicle occupant is in a sitting position and thus is located more closely to the steering wheel. Hence, when the vehicle occupant is in a sitting position, the tether restricts the distance at which the airbag deploys toward the driver. Since the airbag strives for completely deploying, high forces are acting on the tether.

SUMMARY OF THE INVENTION

Thus, it is an object of the present invention to state a retaining device for a tether which is adapted to absorb high forces and still reliably releases the tether when needed.

This object is achieved, according to the invention, by a releasable retaining device for a tether of an airbag, comprising a retainer, a blocking member made from metal which is movably supported in the retainer and which is displaceable between a blocking position in which it maintains the tether blocked and a release position in which the tether is released, and comprising a pyrotechnical igniter coupled to the blocking member such that, upon activation of the igniter, it is displaced from the blocking position to the release position.

Due to the blocking member made from metal, such retaining device offers the advantage that it can absorb high transverse forces, especially transverse forces up to 5 kN or more. Such high transverse forces occur by the fact that the airbag has to be withheld by the tether for a standard position, for example a sitting position, of a vehicle occupant. Upon activation of the igniter, the airbag is released for a reclined position of a vehicle occupant. The retaining device may also be referred to as tether activation unit (TAU).

The blocking member may be supported to be linearly movable or pivotable. The type of support can be chosen depending on the space situation. In this way, the retaining device can be especially flexibly used.

For example, the blocking member comprises a sleeve, a hook or a piston rod including a piston. At the hook equally a piston may be disposed. A sleeve or a piston rod is especially properly suited as blocking member supported to be linearly movable, whereas a hook is especially properly suited as a pivoted blocking member. A metal sleeve moreover can be easily manufactured and is very stable so that it can absorb high transverse forces.

When using a sleeve, especially advantageously said sleeve may be free from mounting parts, except for the pyrotechnical igniter, in the interior. The pressure space in the interior of the sleeve is only formed by the surface area of the sleeve, the pyrotechnical igniter at one end of the sleeve and the part of the retainer provided at the free end (on the far side of the igniter). Thus, advantageously the number of the component parts and the mass to be moved is kept small. Apart from the sleeve and the pyrotechnical igniter and the electric feed line thereof, no components of the retaining device have to be displaced or separated from the igniter.

Alternatively, the blocking member may be a cast part. In particular, a piston rod or a hook can be easily manufactured as cast parts at low cost in large quantities.

The retainer is a plastic component, for example, especially an injection-molded part. In this way, complex retainer geometries can be easily realized. The retainer may be a one-part or multi-part member. For example, the retainer may be assembled of two half-shells.

The blocking member preferably is tightly connected to the igniter. Due to the tight connection to the igniter, the retaining device may have an especially compact and space-saving structure. In addition, the tether can be released especially reliably. The igniter may be fastened, for example, to a plastic element, with the sleeve being tightly, and especially non-releasably, connected to the plastic element.

As an alternative, the igniter may be tightly connected to the retainer. In this case, when releasing the igniter, the blocking member can be moved away from the igniter in one direction. It is obvious to fasten the igniter to the retainer especially when the blocking member is a cast part, as e.g. integrally cast fasteners are difficult to be materialized on cast parts. Snap elements for fastening the igniter can be easily integrated on the retainer, especially when the retainer is a plastic part.

The igniter is a pyrotechnical igniter, for example. Those igniters are especially reliable and safe.

According to one embodiment, an end of the sleeve on the far side of the igniter is received in the retainer to be at least substantially pressure-tightly movable. In particular, this allows pressure to be built up inside the sleeve so that the sleeve can be displaced, viz. from the blocking position to the release position. In this way, the tether can be released.

In an alternative embodiment, in the retainer venting holes may be arranged, especially when the igniter is tightly connected to the retainer. Thus, excessive pressure which would impede movement of the blocking member and would impair the release of the tether is prevented from building up on a side of the blocking member facing away from the igniter.

The release of the tether can be carried out in response to various parameters, for instance a seat position, a vehicle speed and/or an occupant weight in order to provide most ideal restraining conditions depending on the situation.

The retainer may have a projection protruding into the interior of the sleeve. This results in a labyrinth effect improving the pressure-tight support of the sleeve. In addition, the sleeve may be oriented at the retainer via the projection.

Preferably, the blocking member and/or the igniter are captively enclosed in the retainer. In this manner, the blocking member and/or the igniter is/are prevented from detaching from the retaining device even after activation of the igniter.

According to one embodiment, the igniter is releasably or tightly connected to the retainer. A releasable connection of the igniter to the retainer serves, above all, for securing the blocking member inside the retainer against inadvertent slipping, when the blocking member is tightly connected to the igniter. Especially, the tether is prevented from being inadvertently released. When triggering the igniter, the connection is released so that the tether can be released. Tight connection of the igniter to the retainer helps ensure a captive connection.

Preferably, the igniter is connected to the retainer by means of a snap-fit. A snap-fit enables the igniter to be easily and inexpensively mounted on the retainer.

In one embodiment, the retainer has a slit for receiving the tether, the sleeve being received on both sides of the slit in a seat. Thus, stable support of the sleeve in the retainer is ensured, enabling, in turn, the absorption of high transverse forces. In particular, the sleeve is adjacent to the retainer almost along its entire length. Thus, bearing against the igniter is not required.

Moreover, the invention is achieved by a housing for an airbag, comprising a retaining device according to any one of the preceding claims, the retaining device being arranged on the outside of the housing and the housing including a through-opening for the tether so that the tether may extend toward the retaining device. In this way, the tether may be connected to the retaining device without the retaining device interfering with the folding of the airbag. Moreover, the igniter is shielded against the occupant in this manner, and the igniter is prevented from hitting the occupant after being triggered.

The retaining device may be clipped to the housing. Thus, the retaining device can be fastened to the housing especially easily and without any further aids. Alternatively, the retaining device may be screwed or secured in any other suitable manner to the housing.

Preferably, a safety catch is provided for the igniter. It prevents the igniter from causing damage to other vehicle components. Furthermore, the igniter can be removed, when the released airbag is replaced, together with the housing, before a new airbag is inserted in the course of repair.

BRIEF DESCRIPTION OF THE DRAWINGS

Further features and advantages of the invention will be evident from the following description and from the following drawings which are referred to and wherein.

DESCRIPTION

Figure 1:
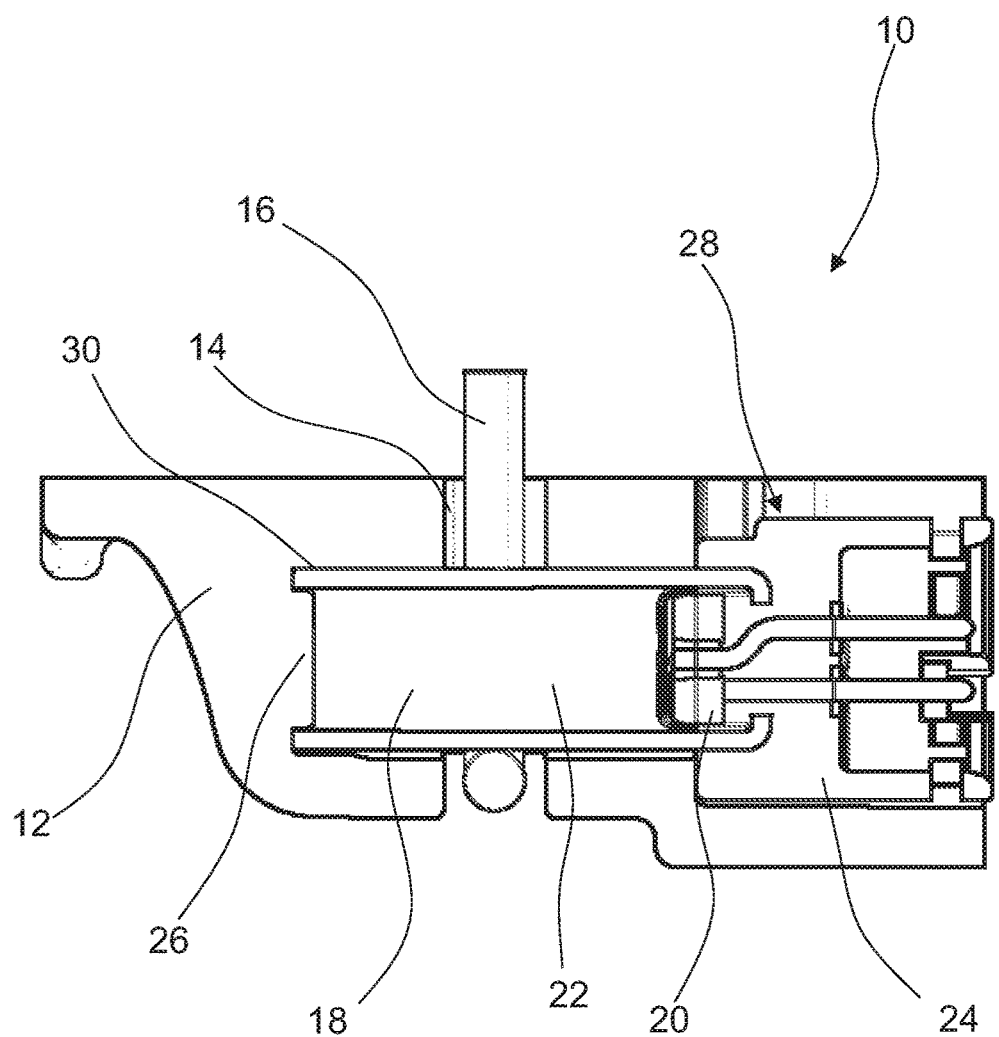
FIG. 1 shows a retaining device according to the invention in a sectional view.

FIG. 1 illustrates a retaining device 10 according to the invention in a sectional view. The retaining device 10 comprises a retainer 12 having a slit 14 for receiving a tether 16. The retainer 12 preferably is an injection-molded part. In this way, the retainer 12 can be manufactured at especially low cost. Furthermore, the retaining device 10 comprises a blocking member 18 made from metal and an igniter 20 coupled to the blocking member 18. The igniter 20 preferably is a pyrotechnical igniter.

In the representation shown in FIG. 1, the blocking member 18 is in a blocking position in which it maintains the tether 16 blocked in the slit. For this purpose, the tether 16 has a loop laid around the blocking member 18. As long as the tether 16 is blocked in the slit, the tether can absorb forces, when the airbag is inflating, so that deployment of the airbag can be influenced. In particular, the tether can influence the shape and/or the position of the inflated airbag. By releasing the tether at a particular point in time, also the deployment behavior of the airbag can be influenced.

The blocking member 18 preferably is a sleeve 22. Said sleeve is tightly connected to the igniter 20. In the shown example embodiment, the sleeve 22 includes an inwardly bent collar at one end and is surrounded, e.g. by injection-molding or foaming, by a plastic element 24 of the igniter 20. Consequently, the sleeve 22 is tightly anchored in the igniter 20. The igniter 20 is equally embedded in the plastic element 24.

One end of the sleeve 22 on the far side of the igniter 20 is received to be substantially pressure-tightly movable in the retainer 12.

The retainer 12 includes a projection 26 protruding into the sleeve 22. The projection 26 improves the sealing of the sleeve 22 and orientates the sleeve 22 within the retainer.

In order to prevent the sleeve 22 from slipping within the retainer 12 already before activation of the igniter 20, the igniter 20 is releasably connected to the retainer 12 via a snap-fit 28. The snap-fit 28 is materialized, for example, by a dimple in the retainer 12 and/or the igniter 20 in which a corresponding elevation of the igniter 20 or the retainer 12 engages. The dimple and the elevation are so flat, however, that the retainer 12 and the igniter 20 can easily detach from each other, when pressure is built up inside the sleeve 22.

The sleeve 22 is received on both sides of the slit 14 in a seat 30. The sleeve 22 can thus bear against the retainer 12 and can absorb high transverse forces when tensile force acts on the tether 16.

Figure 2:
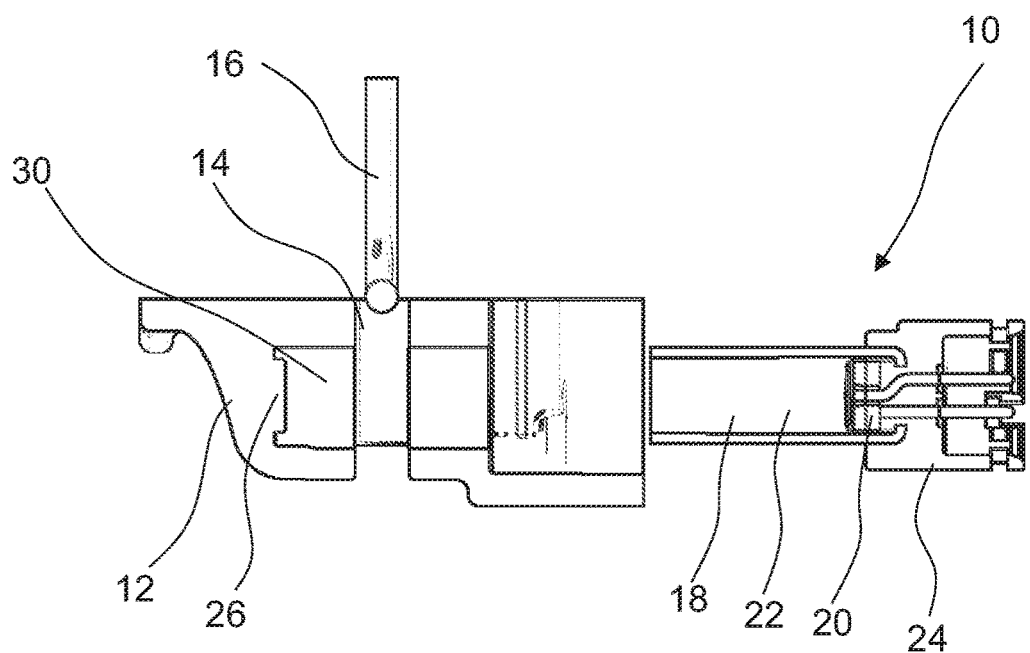
FIG. 2 shows the retaining device from FIG. 1 after activation of the igniter in a sectional view.

FIG. 2 illustrates the retaining device 10 in a condition in which the igniter 20 has been triggered and the blocking member 18 is in a release position.

When the igniter 20 is triggered, the pressure inside the sleeve 22 is increased, as the latter is supported substantially pressure-tightly within the retainer 12. The increasing pressure helps disconnect the snap-fit 28 between the retainer 12 and the igniter 20, and the sleeve 20 is displaced within the retainer 12 and, resp., is moved out of the retainer 12. The sleeve 22 is pulled out of the loop of the tether 16 so that the tether 16 is released and the airbag can completely deploy.

Figure 3:
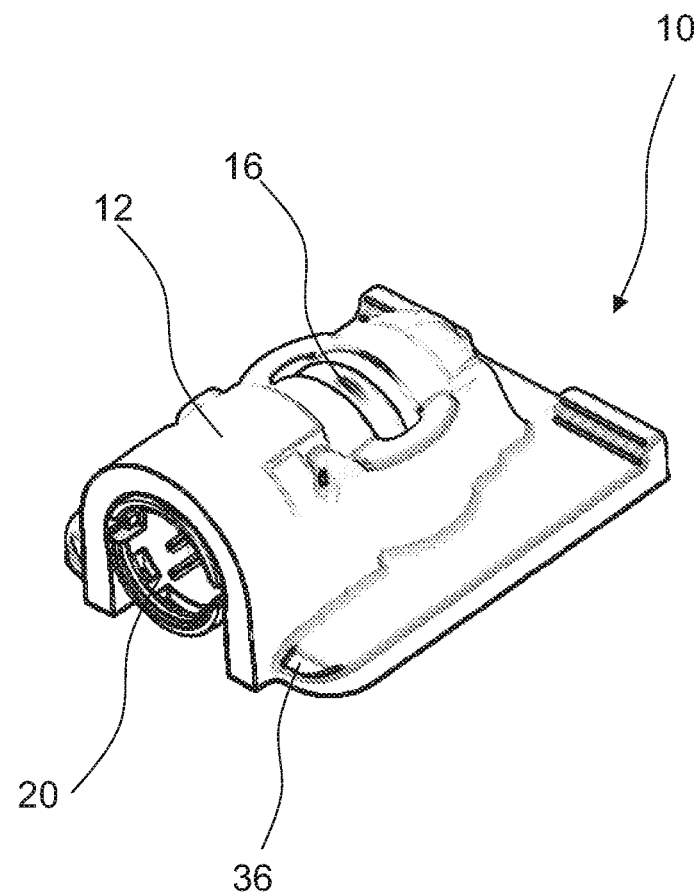
FIG. 3 shows a perspective view of the retaining device.

FIG. 3 illustrates the retaining device 10 once again in a perspective view.

Figure 4:
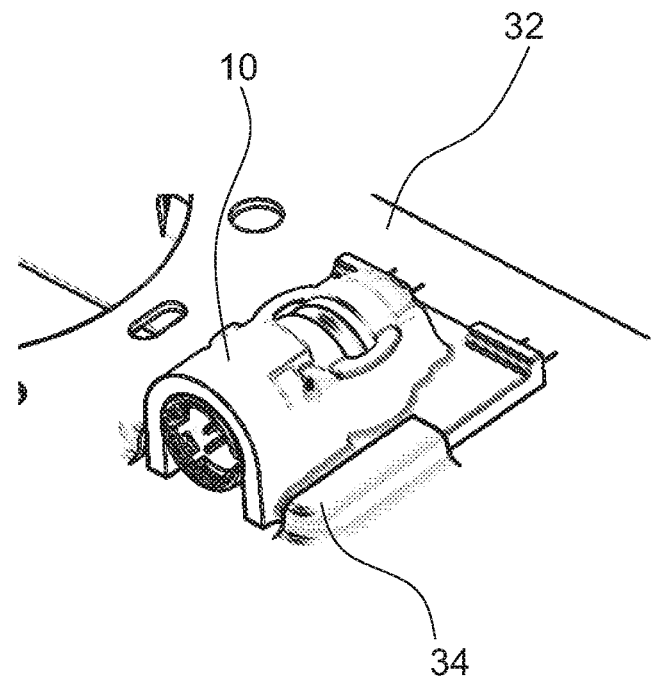
FIG. 4 shows a perspective view of a housing according to the invention comprising a retaining device.

FIG. 4 illustrates the retaining device 10 on a housing 32, the housing 32 being only partially shown. It is evident that the housing 32 includes snap-fit elements 34 by means of which the retaining device 10 is clipped to the housing 32. More exactly speaking, the retainer 12 of the retaining device 10 includes a dimple 36 in which a non-visible projection of the snap-fit elements 34 may engage.

Figure 5:
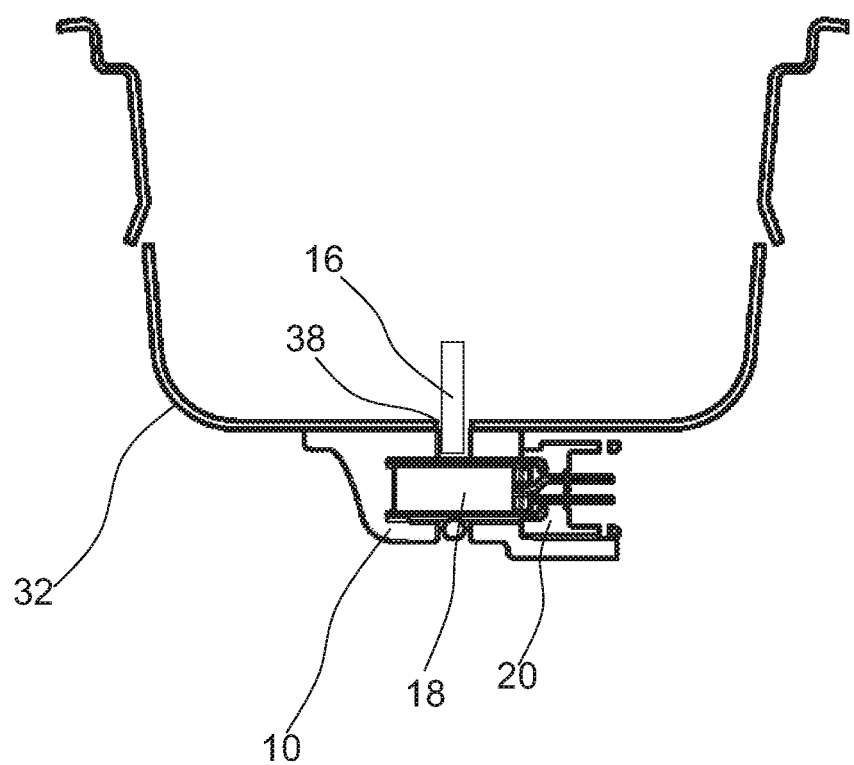
FIG. 5 shows the housing according to the invention comprising a retaining device in a sectional view.

FIG. 5 illustrates the housing 32 comprising a retaining device 10 in a sectional view. The blocking member 18 is in the blocking position. In this representation, it is clear that the tether 16 can extend through a through-opening 38 within the housing 32 to the retaining device 10, the retaining device 10 being arranged on an outside of the housing 32. The tether 16 is only partially shown, in fact the tether 16 is longer and is connected to an airbag (not shown).

Hereinafter like reference numerals will be assigned to like structures having like functions.

Figure 6:
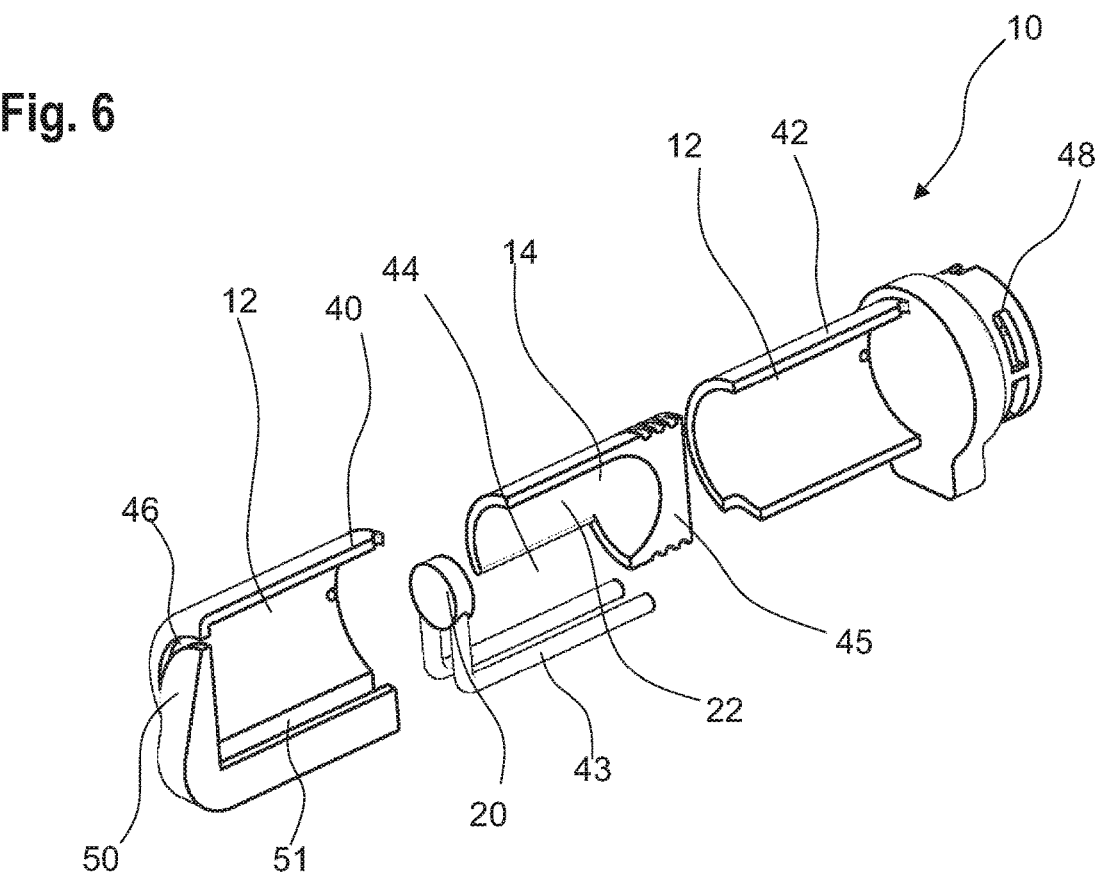
FIGS. 6 to 15 show different further embodiments of a retaining device according to the invention.

FIGS. 6 and 7 illustrate another embodiment of a retaining device 10 comprising a retainer 12 and a blocking member 18 which is supported to be linearly movable in the retainer 12. The blocking member 18 is captively received in the retainer 12.

In FIG. 6, the retaining device 10 is shown in an exploded sectional view.

The retainer 12 in this embodiment is a multi-part member and comprises an outer housing 40 and an inner sleeve 42, wherein the blocking member 18 is guided along an inner wall of the inner sleeve 42. The outer housing 40 is substantially pot-shaped and is put over the inner sleeve 42. Both the outer housing 40 and the inner sleeve 42 of the retainer 12 may be made from plastic.

The blocking member 18 comprises a sleeve 22, with a cutout 44 extending to an axial end of the sleeve 22 being disposed in a wall of the sleeve 22. At the opposite axial end, the sleeve 22 is closed, especially by a piston 45. The inner geometry of the inner sleeve 42 is adapted to an outer wall of the piston 45 so that, upon activation of the igniter, pressure can build up in the interior of the sleeve 22, thus causing the blocking member 18 to move.

At one end of the retainer 12, especially in the outer housing 40, a recess 46 is disposed. The recess 46 is formed to correspond to a cross-section of the sleeve-shaped portion 22 of the blocking member 18 so that the blocking member 18, and especially the sleeve 22, can be moved through the recess 46.

At an end of the retainer 12 on the far side of the recess 46 a connecting element 48 is arranged which serves for fastening the retainer 12 to a housing 32.

Moreover, an igniter 20 which is disposed in the interior of the retainer 12 and is tightly connected thereto is provided. The igniter 20 is disposed in the blocking member 18 between the piston 45 and a wall 50 of the retainer 12, especially of the outer housing 40.

Electric wires 43 disposed between the inner sleeve 42 and the outer housing 40 of the retainer 12 lead to the igniter 20. For this purpose, wirings 51 in the form of grooves are provided in the retainer 12, especially in the outer housing 40.

Figure 7A:
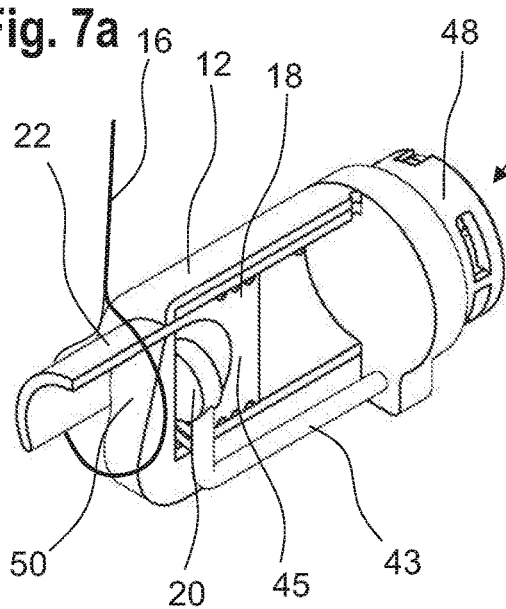
Figure 7B:
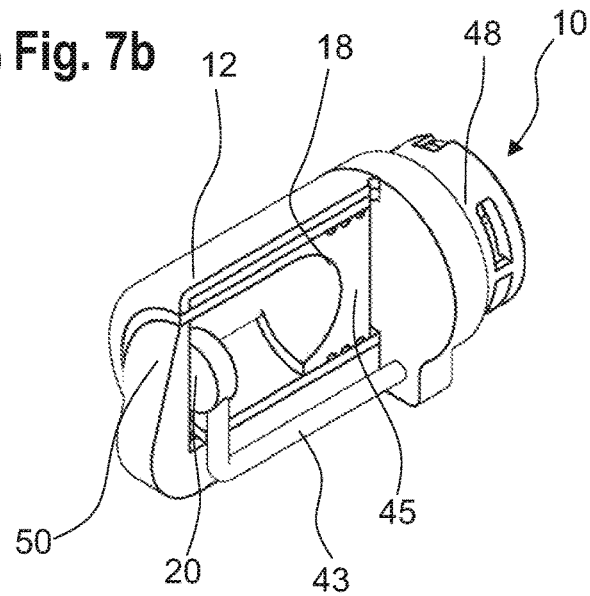

Each of the FIGS. 7a and 7b illustrates the retaining device 10 from FIG. 6 in a partial section view, wherein in FIG. 7a the blocking member 18 is arranged in the blocking position in which it maintains a tether 16 to be blocked, and in FIG. 7b the blocking member is arranged in a release position in which the tether 16 is released.

In the blocking position, the blocking member 18 partly protrudes through the recess 46 from the retainer 12, in particular the sleeve 22 protrudes from the retainer 12. The tether 16 is laid in a loop around the blocking member 18.

When the igniter 20 is triggered, the pressure in the interior of the sleeve 22 increases, as the latter is supported substantially pressure-tightly within the retainer 12. In this way, the sleeve 22 is moved into the retainer 12 and the blocking member 18 is thus moved to the release position. The release position is illustrated in FIG. 7b.

Figure 8:
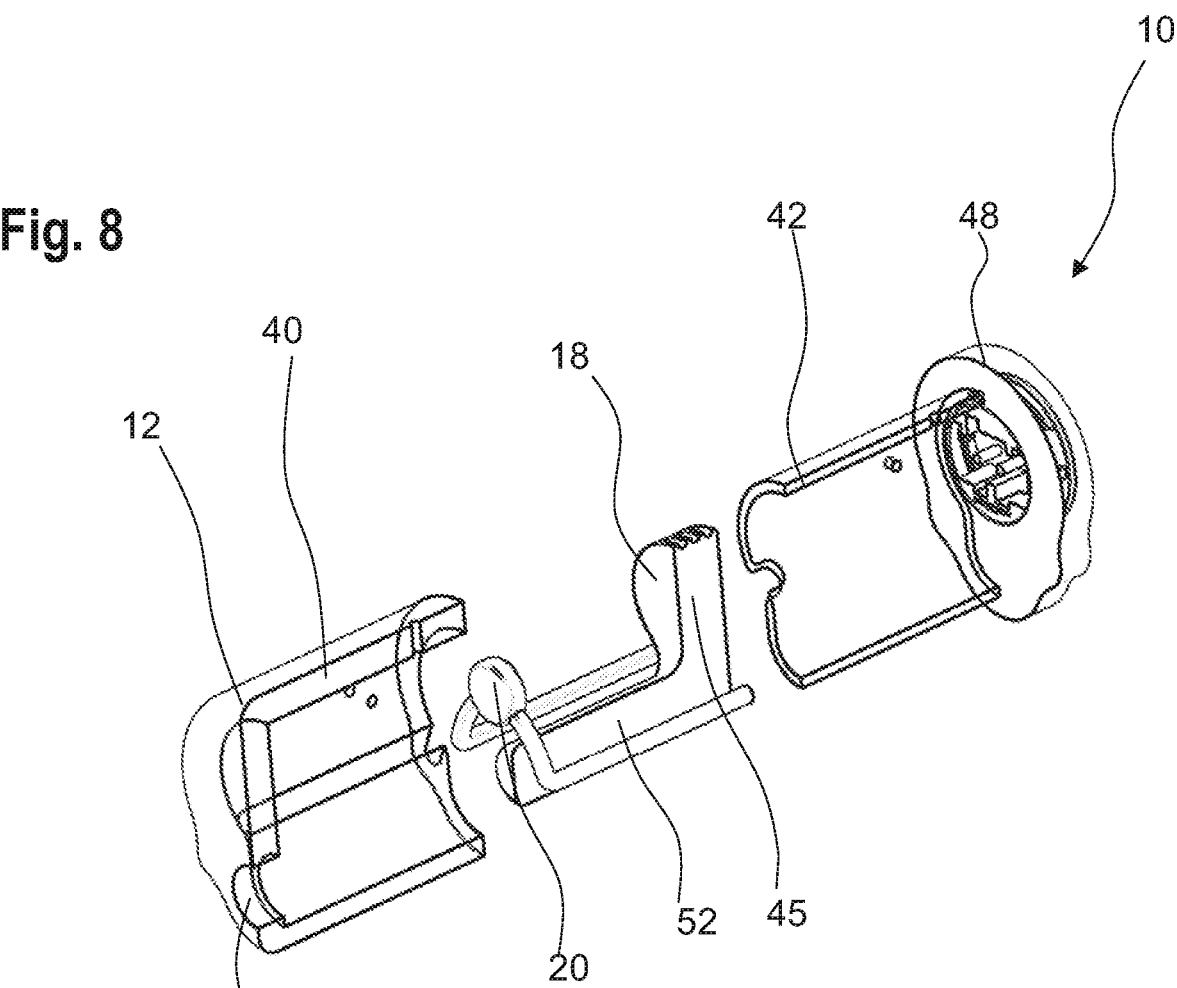
Figure 9:
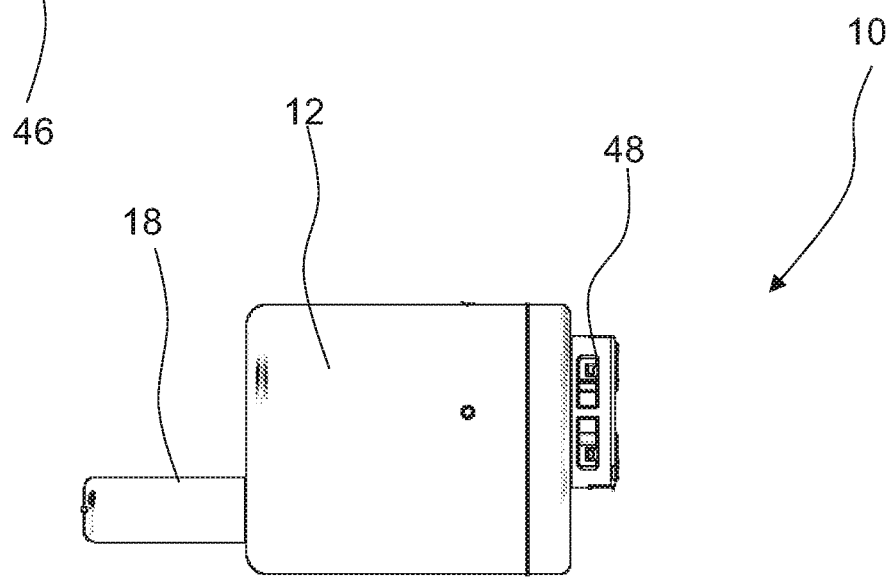

FIGS. 8 and 9 illustrate another embodiment of a retaining device 10 according to the invention. FIG. 8 illustrates the retaining device 10 in an exploded sectional view, FIG. 9 illustrates a lateral view thereof with the blocking member 18 being in the blocking position.

This embodiment differs from the embodiment described in connection with FIGS. 6 and 7 substantially by the shape of the blocking member 18.

The blocking member 18 comprises a piston rod 52 having a piston 45, the piston 45 being guided in the inner sleeve 42 of the retainer 12, just as in the preceding embodiment. The piston rod 52 is disposed eccentrically on the piston in this embodiment.

The piston rod 52 in the blocking position protrudes through the recess 46 from the retainer 12 and is moved into the retainer 12 for releasing a tether 16. Here, the shape of the recess 46 substantially corresponds to a cross-section of the piston rod 52.

Figure 10:
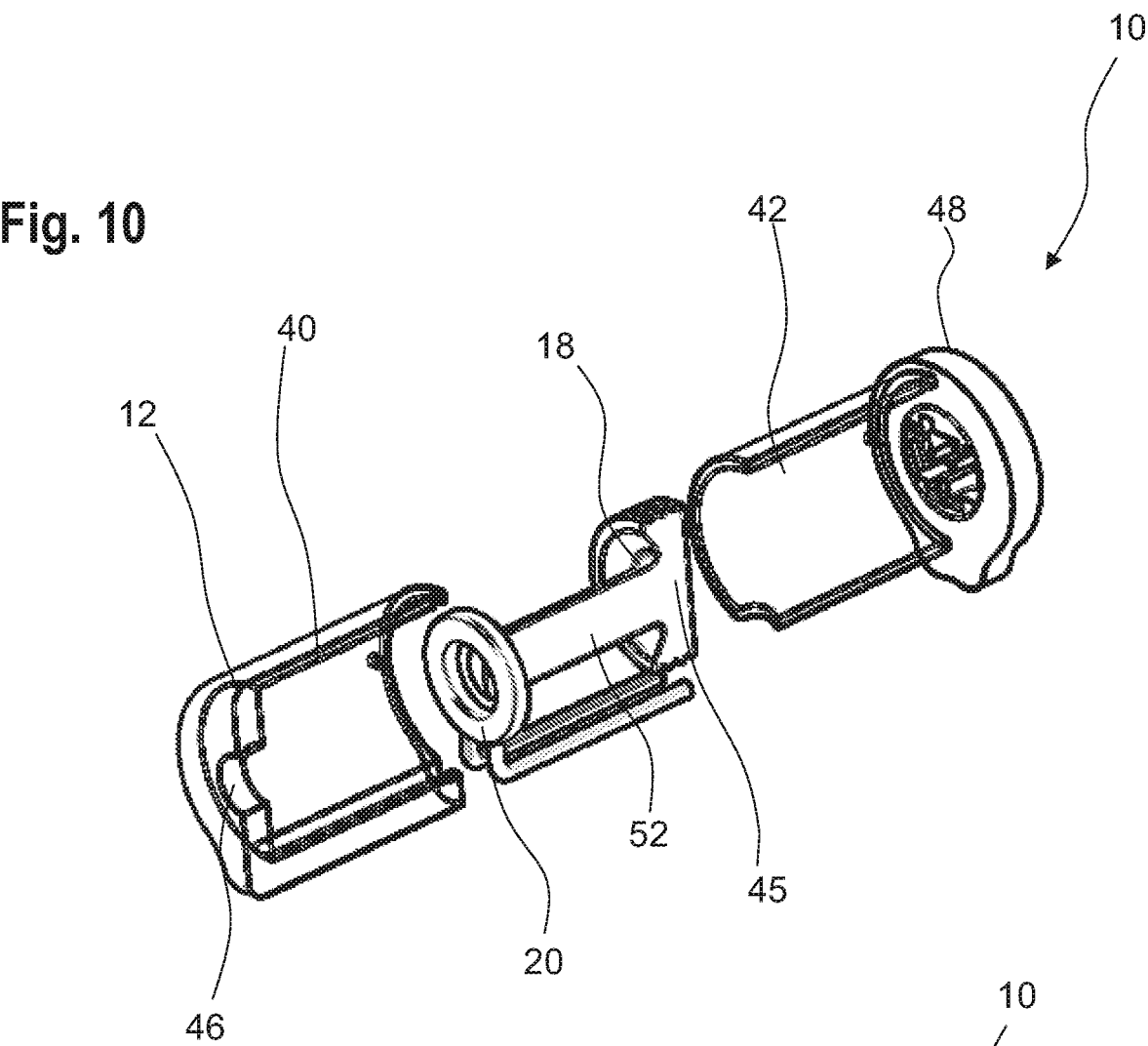
Figure 11:
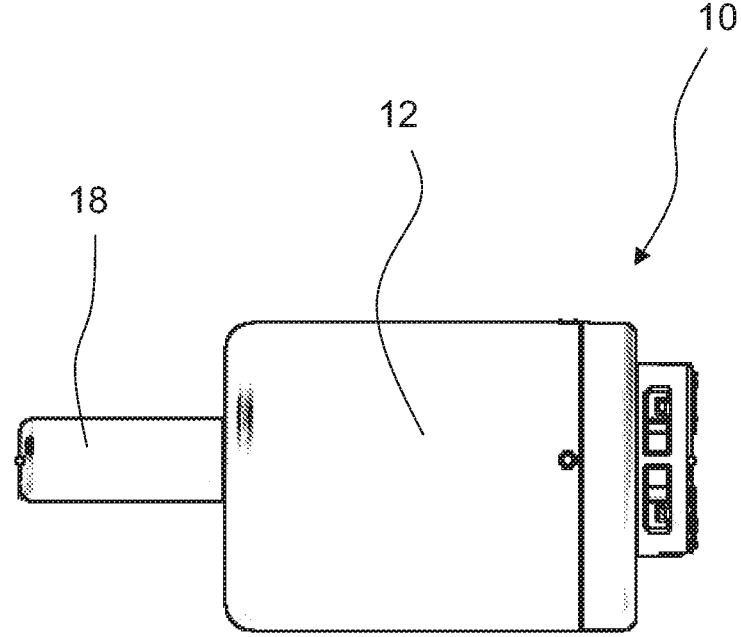

FIGS. 10 and 11 illustrate another embodiment of a retaining device 10 according to the invention. FIG. 10 illustrates the retaining device 10 in an exploded sectional view, FIG. 11 shows a lateral view thereof, with the blocking member 18 being in the blocking position.

The embodiment according to FIGS. 10 and 11 differs from the embodiment illustrated in FIGS. 8 and 9 by the geometry of the blocking member 18. The blocking member 18 comprises a piston 45 having a piston rod 52, the piston rod 52 being arranged centrally on the piston 45. In particular, the blocking member 18 has a rotationally symmetric design.

Figure 12:
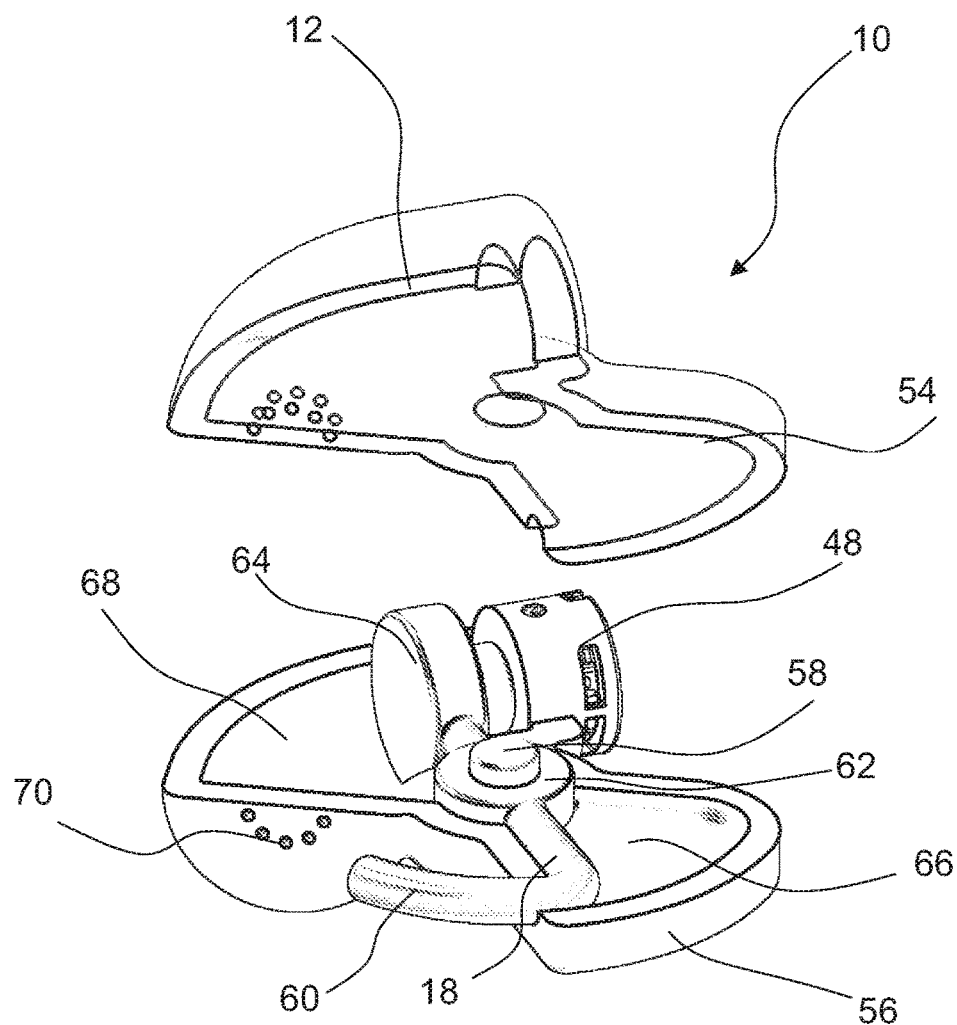
Figure 13A:
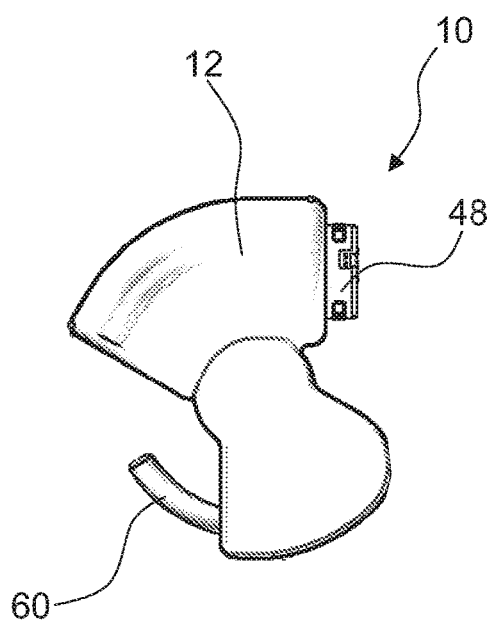
Figure 13B:
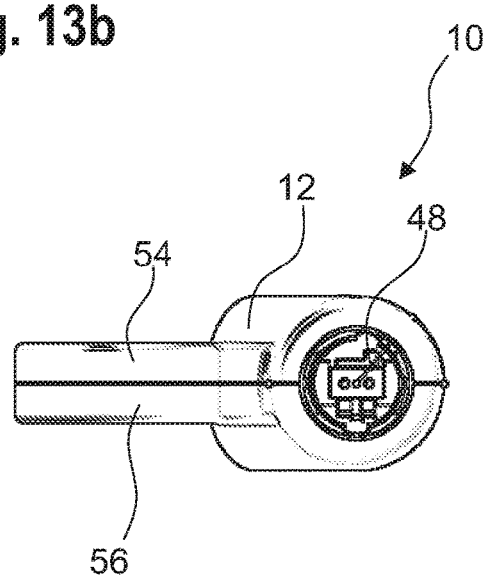

FIGS. 12 and 13 show another embodiment of a retaining device 10 according to the invention. FIG. 12 illustrates the retaining device 10 in an exploded view, FIGS. 13a and 13b illustrate the retaining device 10 in a top view and a lateral view.

The retaining device 10 comprises a retainer 12 in which a blocking member 18 is pivoted. The retainer 12 is assembled of two half-shells 54, 56 which are preferably made from plastic.

A bolt 58 serving as a bearing for the blocking member 18 is integrally formed centrally inside the retainer 12, especially on one of the two half-shells 54, 46.

The blocking member 18 comprises a hook 60, a ring-shaped bearing 62 and a piston 64, the hook 60 and the piston 64 being integrally formed on opposite sides of the ring-shaped bearing 62.

The retainer 12 includes two chambers 66, 68 which, in a top view onto the retainer 12, are substantially configured as pitch circles. The hook 60 is disposed in a first chamber 66 and the piston 64 is disposed in a second chamber 68. The geometry of the chambers 66, 68 defines a maximum range of motion of the blocking member 18. In this embodiment, too, the blocking member 18 is captively arranged in the retainer 12.

The igniter 20 is disposed in and fastened to the retainer 12. Especially, the igniter 20 is arranged in the second chamber 68 and, upon activation of the igniter 20, drives the piston 64. For this purpose, the piston 64 is substantially pressure-tightly supported in the chamber 68.

In order to optimize mobility of the piston 64 and thus also of the blocking member 18, venting holes 70 are formed in the second chamber 68. Said venting holes prevent counter-pressure which would decelerate movement of the piston 64 from building up in the retainer 12.

In FIGS. 12 and 13a, the blocking member 18 is shown in the blocking position. Part of the hook 60 protrudes from the retainer 12. Said part serves for retaining a tether 16.

When the igniter 20 is triggered, the piston 64 is driven and the blocking member 18 is swiveled so that the hook 60 is moved into the retainer 12. Consequently, the tether 16 is released.

Figure 14:
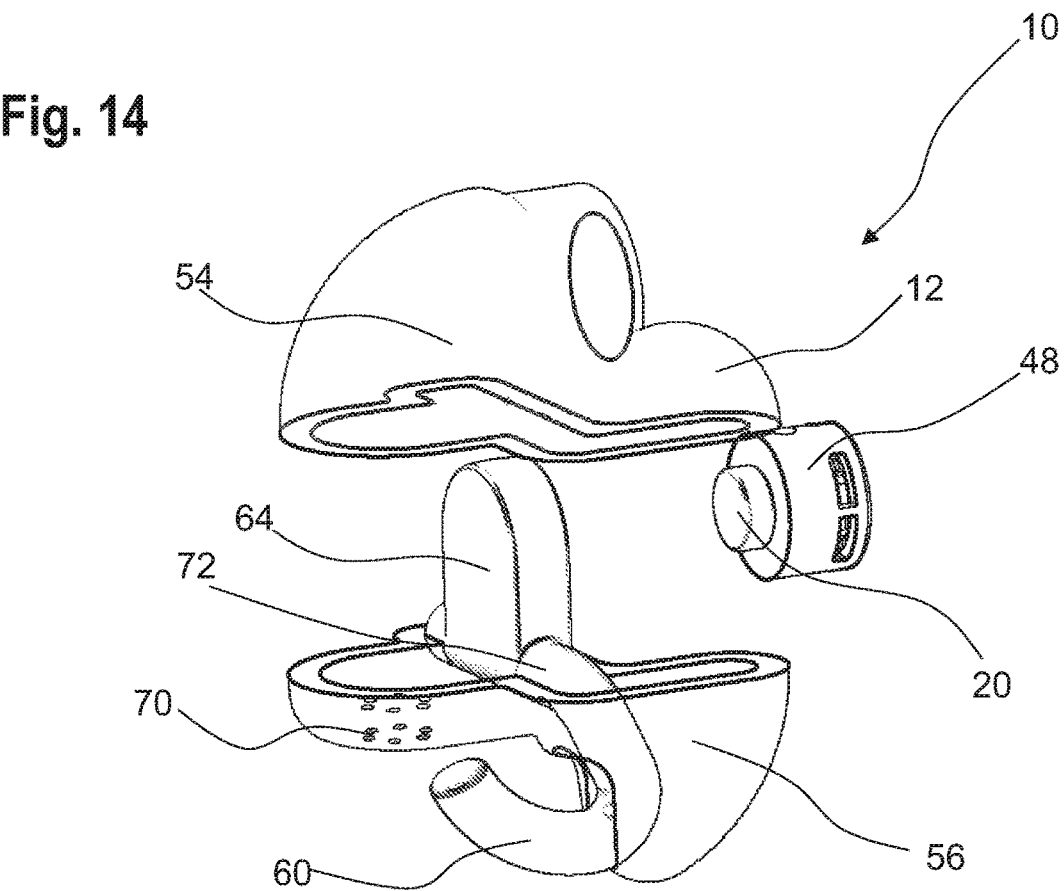
Figure 15A:
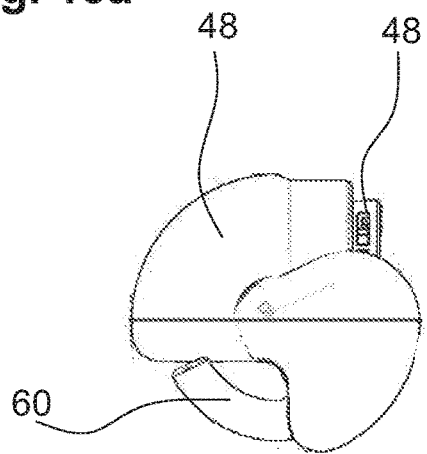
Figure 15B:
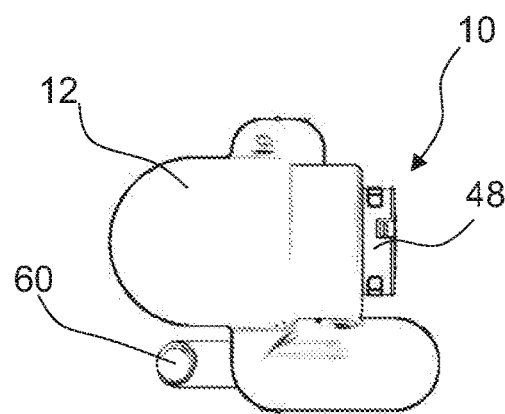

FIGS. 14 and 15 illustrate another embodiment of a retaining device 10 according to the invention. Said embodiment is similar, as to its functioning, to the embodiment described in connection with FIGS. 12 and 13, although it is different in the design.

Although in this embodiment, too, the retainer 12 includes two half-shells 54, 48, a separating plane along which the retainer 12 is divided extends along an axis of rotation about which the blocking member 12 is pivoted, whereas in the preceding embodiment the separating plane extends perpendicularly to the axis of rotation.

The blocking member 18 equally comprises a hook 60 which in a blocking position protrudes from the retainer 12 to retain a tether 16, and comprises a piston 64. In addition, the blocking member 18 comprises a bearing journal 72 that is formed integrally with the blocking member 18, especially with the piston 64.

In the retainer 12 appropriate dimples are provided in which the bearing journal 72 is rotatably supported so that the blocking member 18 is pivoted.

Upon activation of the igniter 20, in turn the piston 64 is driven to swivel the blocking member 18 and to move the hook 60 into the retainer 12 so that a tether 16 is released.

The invention claimed is:

1. A releasable retaining device (10) for a tether (16) of an airbag, comprising a retainer (12), a blocking member (18) made from metal which is movably supported in the retainer (12) and which is displaceable between a blocking position in which it maintains the tether (16) blocked and a release position in which the tether (16) is released, and comprising a pyrotechnical igniter (20) coupled to the blocking member (18) such that, upon activation of the igniter (20), the blocking member is displaced from the blocking position to the release position, wherein the blocking member (18) comprises a sleeve (22) which, apart from the pyrotechnical igniter, is free from built-in parts in its interior.

2. The retaining device (10) according to claim 1, wherein the blocking member (18) is supported to be linearly movable or to be pivotable.

3. The retaining device (10) according to claim 1, wherein the blocking member (18) comprises a sleeve (22), a hook (60) or a piston rod (52) including a piston (45, 64).

4. The retaining device (10) according to claim 1, wherein the igniter (20) is tightly connected to the blocking member (18).

5. The retaining device (10) according to claim 1, wherein the igniter (20) is tightly connected to the retainer (12).

6. The retaining device (10) according to claim 1, wherein an end of the sleeve (22) on the far side of the igniter (20) is received to be at least substantially pressure-tightly movable within the retainer (12).

7. The retaining device (10) according to claim 1, wherein venting holes (70) are disposed in the retainer (12).

8. The retaining device (10) according to claim 1, wherein the retainer (12) includes a projection (26) protruding into the interior of the sleeve (22).

9. The retaining device (10) according to claim 1, wherein the blocking member (18) and/or the igniter (20) is/are captively enclosed in the retainer (12).

10. The retaining device (10) according to claim 1, wherein the igniter (20) is releasably or tightly connected to the retainer (12).

11. The retaining device (10) according to claim 10, wherein the igniter (20) is connected to the retainer (12) by means of a snap-fit (28).

12. The retaining device (10) according to claim 1, wherein the retainer has a slit (14) for receiving the tether (16), the sleeve (22) being received on both sides of the slit (14) in a seat (30).

13. A housing (32) for an airbag, comprising a retaining device (10) according to claim 1, wherein the retaining device (10) is disposed on an outer wall of the housing (32).

14. The housing (32) for an airbag according to claim 13, wherein the retaining device (10) is disposed on the outer face of the housing (32) and the housing (32) includes a through-opening (38) for the tether (16) so that the tether (16) can extend to the retaining device (10).

15. The housing (32) according to claim 13, wherein the retaining device (10) is clipped to the housing (32).

16. The housing (32) according to claim 13, wherein a safety catch is provided for the igniter (20).

* * * * *